US012809023B2

(12) United States Patent
Ganguly et al.

(10) Patent No.: US 12,809,023 B2
(45) Date of Patent: Nov. 24, 2026

(54) TECHNIQUES FOR ESTIMATING ROOM BOUNDARIES AND LAYOUT USING MICROPHONE PAIRS

(71) Applicant: HARMAN INTERNATIONAL INDUSTRIES, INCORPORATED, Stamford, CT (US)

(72) Inventors: Anshuman Ganguly, Commerce, MI (US); Abdullah Kucuk, Novi, MI (US); Kadagattur Gopinatha Srinidhi, Northville, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 114 days.

(21) Appl. No.: 18/828,892

(22) Filed: Sep. 9, 2024

(65) Prior Publication Data

US 2025/0085421 A1 Mar. 13, 2025

Related U.S. Application Data

(60) Provisional application No. 63/582,464, filed on Sep. 13, 2023, provisional application No. 63/582,467, filed on Sep. 13, 2023.

(51) Int. Cl.
*G01S 15/89* (2006.01)
*G01S 7/54* (2006.01)
*G01S 15/32* (2006.01)

(52) U.S. Cl.
CPC ................ *G01S 15/89* (2013.01); *G01S 7/54* (2013.01); *G01S 15/32* (2013.01)

(58) Field of Classification Search
CPC . G01S 15/89; G01S 7/54; G01S 15/32; G01S 15/08; G01S 5/18; H04R 3/005; H04R 29/00; H04R 7/301; G01H 7/00
(Continued)

(56) References Cited

U.S. PATENT DOCUMENTS 11,125,553 B2 * 9/2021 Chen ...................... G01B 17/00
2011/0317522 A1 * 12/2011 Florencio .............. G01S 3/8006 367/129

(Continued)

OTHER PUBLICATIONS

Zhou et al. ("BatMapper: Acoustic sensing based indoor floor plan construction using smartphones." Proceedings of the 15th Annual International Conference on Mobile Systems, Applications, and Services. 2017., "Zhou") (Year: 2017).*

(Continued)

*Primary Examiner* — Yuqing Xiao
*Assistant Examiner* — Christopher Richard Walker
(74) *Attorney, Agent, or Firm* — Artegis Law Group, LLP

(57) ABSTRACT

In various embodiments, a computer-implemented method comprises emitting a reference audio signal using one or more speakers of an audio processing device located in an acoustic environment, receiving, by each microphone in a microphone pair of the audio processing device, a response of the acoustic environment to the reference audio signal, determining an impulse response of the acoustic environment based on the reference audio signal and the received response of the acoustic environment, determining, based on the impulse response, a plurality of candidate wall distance estimates and a plurality of confidence scores, and determining based on the plurality of candidate wall distance estimates and confidence scores, including candidate wall distance estimates and confidence scores from one or more other audio processing devices, a set of wall distance estimates, each wall distance estimate in the set of wall distance estimates being associated with a different wall in a plurality of walls.

20 Claims, 9 Drawing Sheets

(58) Field of Classification Search
USPC .......................................................... 367/124
See application file for complete search history.

(56) References Cited

U.S. PATENT DOCUMENTS

| | | | | |
|---|---|---|---|---|
| 2014/0180629 | A1* | 6/2014 | Dokmanic ............... | G01H 7/00 702/155 |
| 2021/0207974 | A1* | 7/2021 | Zhou .................... | G01C 21/206 |

OTHER PUBLICATIONS

Mabande et al. ("Room geometry inference based on spherical microphone array eigenbeam processing." The Journal of the Acoustical Society of America 134.4 (2013): 2773-2789., "Mabande") (Year: 2013).*

Ribeiro et al. ("Geometrically constrained room modeling with compact microphone arrays." IEEE Transactions on Audio, Speech, and Language Processing 20.5 (2011): 1449-1460., "Ribeiro") (Year: 2011).*

Meng et al., "BatMapper-Plus: Smartphone-Based Multi-level Indoor Floor Plan Construction via Acoustic Ranging and Inertial Sensing", XP047639950, Nov. 17, 2022, pp. 155-167.

* cited by examiner

Table 300

| Direction of Wall based on Device Orientation | | | | |
|---|---|---|---|---|
| | Wall 202a | Wall 202b | Wall 202c | Wall 202d |
| 204a | Front | Left | Back | Right |
| 204b | Front | Left | Back | Right |
| 204c | Back | Right | Front | Left |
| 204d | Back | Right | Front | Left |

FIG. 3

RLM 400a

| Ground Truth Room Layout Distance Matrix | | | | |
|---|---|---|---|---|
| | Wall 202a | Wall 202b | Wall 202c | Wall 202d |
| 204a | 3.9 m | 1.0 m | 2.0 m | 3.0 m |
| 204b | 3.9 m | 3.1 m | 2.0 m | 1.0 m |
| 204c | 1.9 m | 3.1 m | 4.1 m | 1.0 m |
| 204d | 1.9 m | 1.0 m | 4.0 m | 3.1 m |

RLM 400b

| Ground Truth Room Layout Confidence Matrix | | | | |
|---|---|---|---|---|
| | Wall 202a | Wall 202b | Wall 202c | Wall 202d |
| 204a | 1.0 | 1.0 | 1.0 | 1.0 |
| 204b | 1.0 | 1.0 | 1.0 | 1.0 |
| 204c | 1.0 | 1.0 | 1.0 | 1.0 |
| 204d | 1.0 | 1.0 | 1.0 | 1.0 |

FIG. 4

RLM 500a

Sorted Room Layout Distance Matrix

| | Wall W | Wall X | Wall Y | Wall Z |
|---|---|---|---|---|
| 204a | 3.9 m | 1.0 m | 0.6 m | 2.0 m |
| 204b | 3.9 m | 1.0 m | 2.1 m | 0.6 m |
| 204c | 3.6 m | 1.5 m | 0.0 m | 0.0 m |
| 204d | 4.0 m | 1.0 m | 2.0 m | 0.0 m |

RLM 500b

Sorted Room Layout Confidence Matrix

| | Wall W | Wall X | Wall Y | Wall Z |
|---|---|---|---|---|
| 204a | 0.94 | 0.80 | 0.73 | 0.62 |
| 204b | 1.0 | 0.68 | 0.62 | 0.59 |
| 204c | 0.84 | 0.56 | 0.0 | 0.0 |
| 204d | 0.98 | 0.94 | 0.72 | 0.0 |

FIG. 5

RLM 600a

| Final Room Layout Distance Matrix | | | | |
|---|---|---|---|---|
| | Wall 202a | Wall 202b | Wall 202c | Wall 202d |
| 204a | Front – 3.9 m | Left – 1.0 m | Back – 2.0 m | Right – 0.0 m |
| 204b | Front – 3.9 m | Left – 2.1 m | Back – 0.6 m | Right – 1.0 m |
| 204c | Back – 0.0 m | Right – 0.0 m | Front – 3.6 m | Left – 1.5 m |
| 204d | Back – 0.0 m | Right 1.0 m | Front – 4.0 m | Left – 0.0 m |

RLM 600b

| Final Room Layout Confidence Matrix | | | | |
|---|---|---|---|---|
| | Wall 202a | Wall 202b | Wall 202c | Wall 202d |
| 204a | 0.94 | 0.8 | 0.62 | 0.0 |
| 204b | 1.0 | 0.62 | 0.59 | 0.68 |
| 204c | 0.0 | 0.0 | 0.84 | 0.56 |
| 204d | 0.0 | 0.94 | 0.98 | 0.0 |

FIG. 6

| Distance with Highest Confidence Score Across All Devices | |
|---|---|
| | Distance from device 204a |
| Front – Wall 202a | 3.9 m |
| Left – Wall 202b | 1.0 m minus distance from device 204d |
| Back – Wall 202c | 4.0 m minus distance from device 204d |
| Right – Wall 202d | 1.0 m plus distance from device 204b |

Table 700a

Chart 700b

TECHNIQUES FOR ESTIMATING ROOM BOUNDARIES AND LAYOUT USING MICROPHONE PAIRS

CROSS-REFERENCE TO RELATED APPLICATIONS

This application claims priority benefit of the United States Provisional Patent Application titled "BOUNDARY ESTIMATION USING MICROPHONE PAIRS," filed on Sep. 13, 2023, and having Ser. No. 63/582,464, and the United States Provisional Patent Application titled "ROOM LAYOUT ESTIMATION USING MICROPHONE PAIRS," filed on Sep. 13, 2023, and having Ser. No. 63/582,467. The subject matter of these related applications is hereby incorporated herein by reference.

BACKGROUND

Field of the Various Embodiments

The various embodiments relate generally to audio systems and, more specifically, to techniques for estimating room boundaries and layout using microphone pairs.

Description of the Related Art

The layout of a room, such as the size and shape of the room, can drastically affect the acoustics of the room. Understanding the size and shape of a room can help an audio system provide better sound quality for the listener. The first step for an audio system to determine the layout of a room is to estimate the wall boundaries of the room. However, conventional audio systems cannot accurately determine the wall boundaries of a room without using special measurement hardware, and therefore cannot accurately determine the layout of a room.

One approach to determining the wall boundaries of a room is to conduct a sine sweep test. A sine sweep is an audio signal that gradually changes frequency over time and can be used to identify resonance frequencies of an object or structure. A device with a speaker and a microphone can broadcast a sine sweep in a room and capture the impulse responses from the walls of the room. These impulse responses can be measured to estimate the distance from the device to the wall generating a reflection captured in the response. However, this technique is reliant on the relative position of the device in the room. For example, if the device is placed too close to one or more walls, the accuracy of the estimation will be affected. Furthermore, because this technique uses a single device with a speaker and microphone, the impulse response from one wall may interfere with another wall. Conventional audio systems would need to compensate for this interference to determine the boundaries of the other walls, which is difficult and inaccurate. Therefore, an audio system with a single device using a speaker and microphone is not able to accurately estimate the wall boundaries.

Another approach to determining the boundaries of a room requires the audio system to be equipped with one or more cameras. The audio system can use the cameras to capture pictures or videos of each wall relative to the position of the camera. Then the audio system can estimate the wall boundaries based on the placement of the cameras. However, not all audio systems are equipped with one or more cameras or with the ability to estimate wall boundaries based on pictures or videos.

One drawback of both approaches is that even if the audio system is successful at estimating the wall boundaries of a room, the audio system does not know how to utilize the wall boundaries to estimate the layout of the room. Without a room layout estimation, the audio system is not able to determine the acoustics of the room, and therefore cannot adapt to produce the sound quality that would match the acoustics.

As the foregoing illustrates, what is needed in the art is more effective techniques for an audio system to estimate wall boundaries and the layout of a room.

SUMMARY

In various embodiments, a computer-implemented method comprises receiving, by each microphone in a microphone pair of the audio processing device, a response of the acoustic environment to the reference audio signal; determining an impulse response of the acoustic environment based on the reference audio signal and the received response of the acoustic environment; determining, based on the impulse response, a plurality of candidate wall distance estimates and a plurality of confidence scores, each confidence score of the plurality of confidence scores associated with a different candidate wall distance estimate of the plurality of candidate wall distance estimates; and determining based on the plurality of candidate wall distance estimates, the plurality of confidence scores, and candidate wall distance estimates and confidence scores received from one or more other audio processing devices, a set of wall distance estimates, each wall distance estimate in the set of wall distance estimates being associated with a different wall in a plurality of walls in the acoustic environment.

At least one technical advantage of the disclosed techniques relative to the prior art is that, with the disclosed techniques, an audio system can accurately estimate the wall boundaries of a room with minimum setup. The disclosed techniques are not impacted by the relative position of the devices of the audio system in the room allowing for more flexible placement of the devices to estimate the boundaries and layout of a room. Additionally, the audio system does not need to be equipped with a camera or image processing software. Furthermore, the estimated room layout results in a better acoustic model of the room and a corresponding improvement in the quality of sound output by the audio system. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 is a conceptual illustration of an example table detailing the direction of walls based on device orientation, according to various embodiments;

FIG. 4 is a conceptual illustration of example ground truth room layout matrices, according to various embodiments;

FIG. 5 is a conceptual illustration of example sorted room layout matrices, according to various embodiments;

FIG. 6 is a conceptual illustration of example final room layout matrices, according to various embodiments;

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
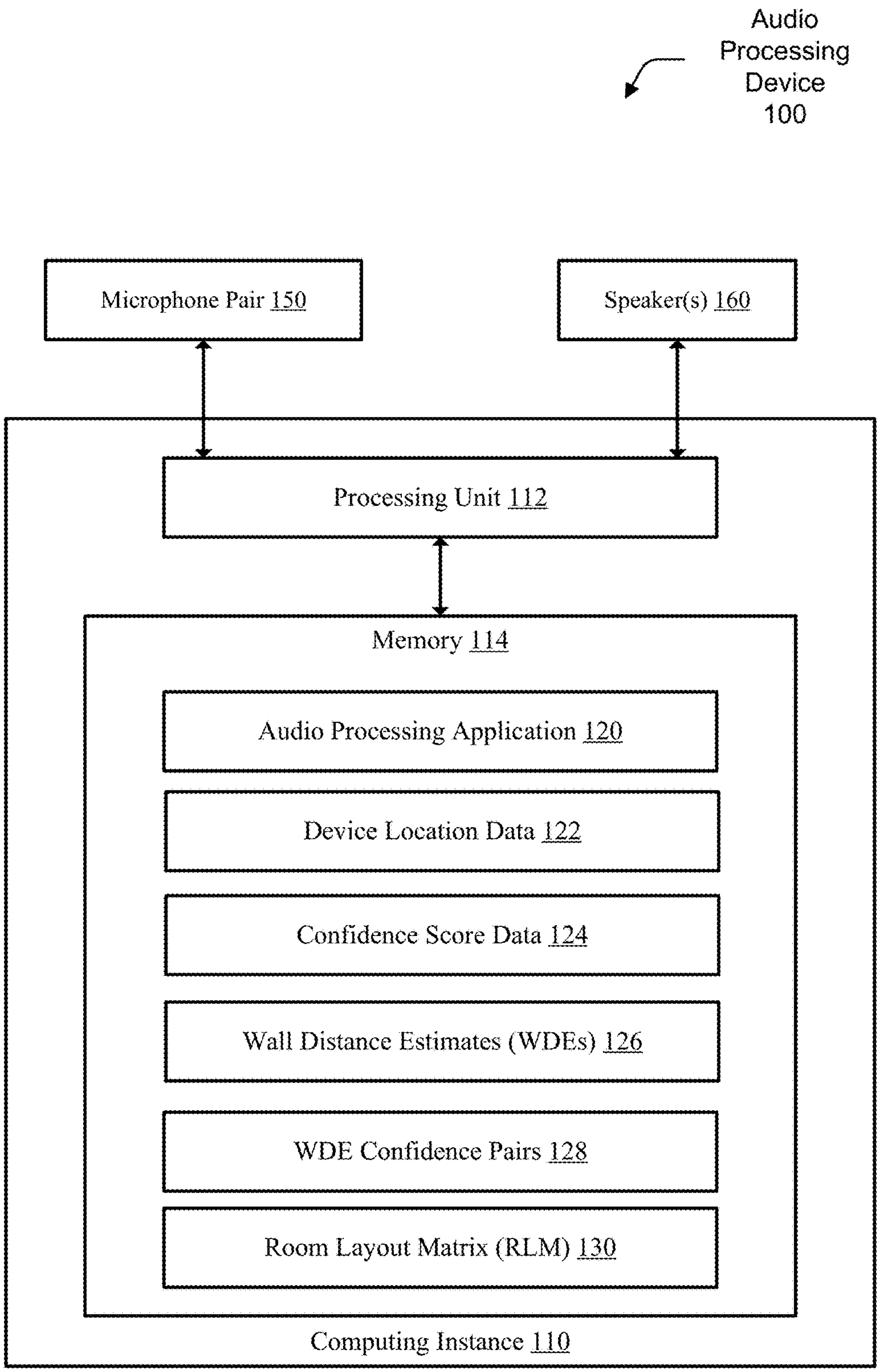
FIG. 1 is a conceptual illustration of a device configured to implement one or more aspects of the various embodiments.

FIG. 1 is a schematic diagram illustrating an audio processing device 100 configured to implement one or more aspects of the present disclosure according to various embodiments. In various embodiments, the audio processing device 100 is a central unit in a home theater system, a soundbar, a vehicle system, and so forth. In some embodiments, the audio processing device 100 is included in a network of multiple audio processing devices 100 that communicate with each other to conduct the techniques disclosed herein. In some embodiments, the audio processing device 100 is included in one or more devices, such as consumer products (e.g., portable speakers, gaming, gambling, etc. products), vehicles (e.g., the head unit of a car, truck, van, etc.), smart home devices (e.g., smart lighting systems, security systems, digital assistants, etc.), communications systems (e.g., conference call systems, video conferencing systems, speaker amplification systems, etc.), and so forth. In various embodiments, the audio processing device 100 is located in various acoustic environments including, without limitation, indoor environments (e.g., living room, conference room, conference hall, home office, etc.), and/or outdoor environments, (e.g., patio, rooftop, garden, etc.). As shown, the audio processing device 100 includes, without limitation, one or more speakers 160, microphone pair 150, and a computing device 110. Furthermore, the computing device 110 includes, without limitation, a processing unit 112 and memory 114. The memory 114 stores various data including, without limitation, an audio processing application 120, device location data 122, confidence score data 124, wall distance estimates (WDEs) 126, WDE confidence pairs 128, and room layout matrix (RLM) 130.

The audio processing device 100 includes one or more speakers 160, which can broadcast or otherwise transmit one or more reference audio signals, such as a sine sweep, within an acoustic environment. In some embodiments, the one or more speakers 160 can include, without limitation, a soundbar with multiple speaker units, one or more loudspeakers, or any other speaker system that reproduces one or more references audio signals by generating soundwaves. In some embodiments, the one or more speakers 160 can playback audio signals to test the acoustics of an acoustic environment. In some embodiments, the one or more reference audio signals can be a sine sweep. Sine sweeps are reference tones used to check frequency response or adverse effects of acoustics in an acoustic environment. In some embodiments, the one or more reference audio signals can be between 20 Hz and 20 kHz in frequency. However, any frequency that is capable of producing a sine sweep or similar audio signal is within the scope of the disclosed embodiments. The one or more speakers 160 can include multiple instances of elements, even when not shown, and still be within the scope of the disclosed embodiments.

Microphone pair 150 (e.g., microphone 150 (1) and microphone 150 (2), which are not shown in FIG. 1), receive or otherwise acquire sound data associated with audio in an acoustic environment of audio processing device 100. The receiving audio includes reflected audio signals associated with sound emitted by the one or more speakers 160. The microphone pair 150 includes various types of sensors that acquire several types of sound (e.g., subsonic pulses, ultrasonic sounds, speech commands, etc.) to determine information about the acoustic environment. In some embodiments, the audio processing system 100 includes other types of sensors (not shown) in addition to the microphones to acquire information about the acoustic environment. Other types of sensors include optical sensors, such as RGB cameras, time-of-flight cameras, infrared cameras, depth cameras, a quick response (QR) code tracking system, motion sensors, such as an accelerometer or an inertial measurement unit (IMU) (e.g., a three-axis accelerometer, gyroscopic sensor, and/or magnetometer), pressure sensors, and so forth. In addition, in some embodiments, sensor(s) 150 can include wireless sensors, including radio frequency (RF) sensors (e.g., sonar and radar), and/or wireless communications protocols, including Bluetooth, Bluetooth low energy (BLE), cellular protocols, and/or near-field communications (NFC).

The processing unit 112 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a CPU configured to operate in conjunction with a GPU. In general, the processing unit 112 can be any technically feasible hardware unit capable of processing data and/or executing software applications.

The memory 114 can be one or more of a readily available memory, such as a random-access memory (RAM) module, read only memory, floppy disk, hard disk, or any other form of digital storage, local or remote, or combination thereof. The processing unit 112 is configured to read data from and write data to the memory 114. In various embodiments, the memory 114 includes non-volatile memory, such as optical drives, magnetic drives, flash drives, or other storage. In some embodiments, separate data stores, such as an external data stores included in a network ("cloud storage") can supplement the memory 114. The audio processing application 120 within the memory 114 can be executed by the processing unit 112 to implement the overall functionality of the computing device 110 and, thus, to coordinate the operation of the audio processing system 100 as a whole. In various embodiments, an interconnect bus (not shown) connects the processing unit 112, the memory 114, the speakers 160, the microphones 150, and any other components of the computing device 110. The memory 114 stores, without limitation, an audio processing application 120, location data 122, impulse response data 124, and wall distance estimates 126.

The computing device 110 is configured to execute one or more software applications. In some alternate embodiments, each of any number of instances of the computing device 110 can include any number of instances of the processor 112 and any number of instances of the memory 114 in any combination. In particular, any number of instances of the computing device 110 (including one) can provide a multiprocessing environment in any technically feasible fashion. For explanatory purposes only, each software application is described as residing in the memory 114 of the computing device 110 and executing on the processor 112 of the computing device 110. However, in some embodiments, the functionality of any number of software applications can be distributed across any number of other software applications that reside in instances of the memory 114 of any number of instances of the computing device 110 and execute on any number of instances of the processor 112 of any number of instances of the computing device 110 in any combination. Further, the functionality of any number of software applications can be consolidated into a single software application, such as audio processing application 120.

As shown, the computing device 110 is configured to execute an audio processing application 120, that implements one or more optimization techniques to accurately determine wall distance estimates (WDEs) of each wall in an acoustic environment and one or more fusion algorithms to accurately determine the room layout of the acoustic environment (e.g., determine the length, width, and height of the acoustic environment). As described previously herein, the room layout of an acoustic environment, such as the size and shape of the acoustic environment, can drastically affect the acoustics. Understanding the size and shape of an acoustic environment can help an audio system provide better sound quality. However, conventional approaches to determine the room layout of an acoustic environment are not practical or accurate.

The audio processing application 120 resides in the memory 114 of the computing device 110 and executes on the processor 112 of the computing device 110. More generally, the functionality of the audio processing application 120 can be distributed across any number of software applications. Each of the software applications can reside in any number of instances of the memory 114 of any number of instances of the computing device 110 and execute on any number of instances of the processor 112 of any number of instances of the computing device 110 in any combination. For explanatory purposes, multiple instances of like objects are denoted with reference numbers identifying the object and parenthetical alphanumeric character(s) identifying the instance where needed.

Generating Wall Distance Estimates

In operation, the audio processing application 120 executes various techniques to determine accurate WDEs of each wall in an acoustic environment. In various embodiments, the audio processing application instructs the speaker (s) 160 to broadcast or otherwise transmit a reference audio signal within the acoustic environment. In some embodiments, the reference audio signal is a sine sweep, but any reference audio signal that reflects off the walls of the acoustic environment and in turn, can be received by the microphone pair 150, can be broadcasted or otherwise transmitted. Each microphone in the microphone pair 150 can acquire or otherwise receive the reflected audio signal from the barriers of the acoustic environment. The audio processing application 120 combines the reflected audio signal with the reference audio signal to generate an impulse response. An impulse response is the reaction of the acoustic environment to the reference audio signal expressed as function of time.

The audio processing application 120 generates WDEs, such as wall distance estimates 126, using the impulse responses to generate estimated distances from a wall of the acoustic environment to a microphone of the microphone pair 150 as a function of the speed of sound and a time associated with a peak amplitude of the impulse response (e.g., due to the round trip time for the reference audio signal to travel from the speaker(s) 160 to the wall, be reflected off the wall, and then return to the microphone). Each WDE is associated with the microphone used in calculating the distance and is associated with the audio processing device 100 that includes the microphone. Each WDE can be represented as a measuring unit, such as meters, feet, or any other measuring metric. The WDEs 126 can be stored in memory 114 of audio processing device 100. In some embodiments, the WDEs 126 can include other WDEs derived from other audio processing devices 100 in the acoustic environment that were sent to the audio processing device 100.

The audio processing application 120 computes confidence scores using amplitudes of the peaks from the impulse response data to rank the respective WDEs 126. A confidence score is a metric that represents the likelihood that a corresponding WDE accurately represents the actual distance from an audio processing device to a wall of the acoustic environment. The confidence score can be computed based on the peak amplitude of peaks from the impulse responses. For example, a confidence score of 1.0 represents the highest confidence and a confidence score of 0.0 represents the lowest confidence. The confidence scores can be stored in memory 114 of the audio processing device 100 as confidence score data 124. Confidence scores data 124 can include confidence scores of WDEs from other audio processing device(s) 100 in the acoustic environment. The audio processing application 120 can generate WDE confidence pairs 128 by associating each WDE in the WDE 126 with the respective confidence score in confidence score data 124.

The audio processing application 120 performs one or more rule-based optimization algorithms that combines multiple WDEs in the WDEs 126 from multiple microphone pairs 150 of multiple audio processing devices 100 to derive a set of valid WDEs that represent each wall in the acoustic environment, including the ceiling and floor. The audio processing application 120 removes global outliers from WDEs 126 based on various tunable thresholds and confidence score data 124. For example, if a given WDE 126 is less than a minimum wall distance threshold or greater than a maximum wall distance threshold, the given WDE is removed. In another example, if a given WDE 126 is associated with a confidence score that is less than a minimum confidence threshold, the given WDE 126 is removed from WDEs 126.

The one or more rule-based optimization algorithms can include clustering algorithms. One example of clustering is clustering WDEs 126 based on the associated microphone in the microphone pair 150 of each audio processing device 100. For instance, if the difference in distance between two or more WDEs associated with the same microphone in the microphone pair 150 is less than a minimum distance threshold, each WDE except for the WDE associated with the highest confidence score is removed from WDEs 126. In some embodiments, the confidence score associated with the remaining WDEs 126 can be averaged with the other confidences scores of the removed WDEs. The minimum distance threshold can be a pre-defined threshold. Another example of clustering is clustering WDEs 126 based on different associated microphones in the microphone pair 150 of the same audio processing device 100. For instance, if the difference in distance between two or more WDEs 126 associated with different microphones of the microphone pair 150 in the same audio processing device 100 is less than a minimum distance threshold, the WDEs are determined to be "valid estimates."

The one or more rule-based optimization algorithms can include identifying and extracting the ceiling and/or the floor estimate of the acoustic environment from the WDEs 126. One example of identifying and extracting the ceiling and/or the floor estimate is to compute the mode of the WDEs 126. For instance, the audio processing application 120 computes the mode of the WDEs 126. If the associated confidence score of each WDE equal to the mode is greater than a minimum confidence threshold, one WDE of the mode can be identified as the "ceiling estimate" or "floor estimate" and the remaining WDEs are removed. The minimum confidence threshold can be a pre-defined threshold.

After the above steps, the audio processing application 120 combines the remaining WDEs associated with both microphones in the microphone pair 150 that are separated by a distance that is less than a minimum distance threshold in no particular order of confidence score. These combined or unified WDEs accurately represent each wall of the acoustic environment from the perspective of the associated audio processing device 100. The above steps can be implemented in each audio processing device 100 in the acoustic environment to generate unified WDEs that accurately represent each wall of the acoustic environment from the perspective of each audio processing device 100 in the acoustic environment.

Generating Room Layout Estimates

The audio processing application 120 executes various techniques to determine the room layout of the acoustic environment. The audio processing application 120 determines an ordinal device among the audio processing device(s) 100 in the acoustic environment. The ordinal device is defined as the reference device where the center of the device is treated as the origin of the room layout of the acoustic environment.

The audio processing application 120 determines device distance estimates using a device layout estimation algorithm. For example, two audio processing devices 100 in an acoustic environment, each including at least one speaker 160, can each transmit an audio signal including a different signature tone into the acoustic environment. The audio processing application 120 of one of the audio processing devices can instruct the speaker 160 to receive both audio signals using one or more microphones. The audio processing application 120 determines an estimated distance between the audio processing devices based on the different signature tones and a time frequency masking operation. The device distance estimates can be stored as device location data 122 in memory 114 of the audio processing device 100. The device location data 122 includes positional information for one or more locations within the listening environment, such as the location of each device. In some embodiments, the device location data 122 includes specific coordinates relative to a reference point. For example, the device location data 122 can store the current positions and/or orientations of each respective audio processing device 100 in the acoustic environment as a distance and angle from a specific reference point. In some embodiments, the device location data 122 includes additional orientation information, such as a set of angles (e.g., $\{\mu, \varphi, \psi\}$) relative to a reference orientation. In such instances, the position and orientation of a given audio processing device 100 and/or a microphone in the microphone pair 150 is stored in the device location data 122 as a set of distances and angles relative to a reference point. The device layout estimation algorithm is described in more detail in U.S. patent application Ser. No. 18/860,604, filed on May 31, 2024, which is incorporated by reference.

The audio processing application 120 will be further described by reference to acoustic environment 200 in FIG. 2 along with examples of room layout matrices, tables, and charts from FIGS. 3-7. However, it is understood that the described techniques are also applicable to other acoustic environments that have different layouts, sizes, and/or a different number of audio processing devices.

Device Setup in Example Acoustic Environment

Figure 2:
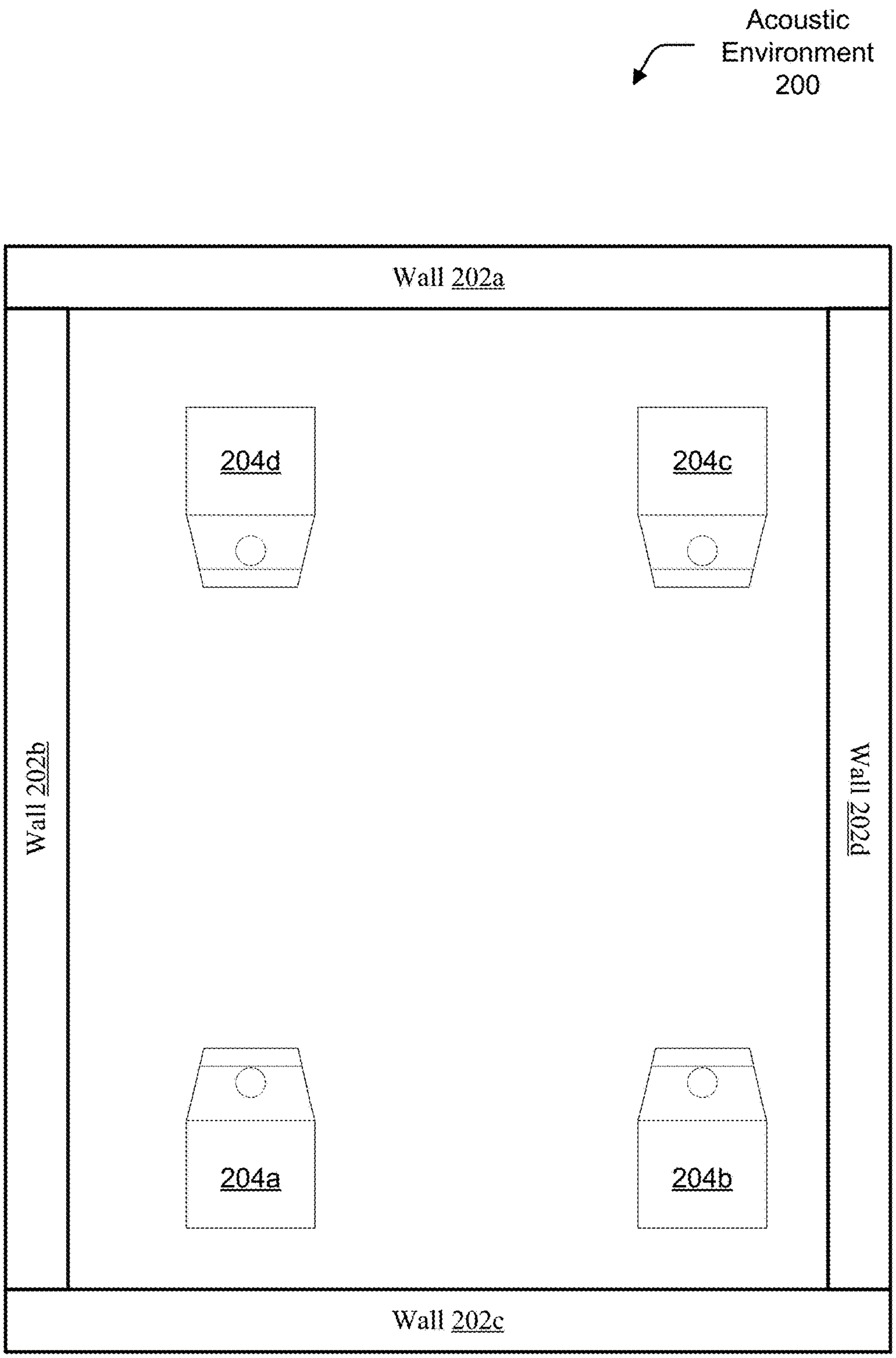
FIG. 2 is a conceptual illustration of example acoustic environment, according to various embodiments.

FIG. 2 is a conceptual illustration of an example acoustic environment 200, according to various embodiments. As shown, the acoustic environment 200 has four walls (not including the ceiling and floor) represented as wall 202*a*-202*d*. Audio processing devices 204*a*-204*d*, which can be examples of audio processing device 100 in FIG. 1, are arranged in the acoustic environment 200 to determine wall distance estimates of the walls 202*a*-202*d* and the room layout estimates of acoustic environment 200. To accurately determine the wall distance estimates and room layout estimates, the audio processing devices 204*a*-204*d* should face at least two different walls. For example, as shown in FIG. 2, audio processing devices 204*a* and 204*b* are facing wall 202*a* and audio processing devices 204*c* and 204*d* are facing wall 202*c*. Additionally, in order to accurately determine the wall distance estimates and room layout estimates, the audio processing devices 204*a*-204*d* should be at the same elevation, such as 1 meter above the floor, in the acoustic environment. Other arrangements are possible, and the arrangement shown in FIG. 2 is not meant to be limiting.

Example of Determining Room Layout Estimates

Referring back to FIG. 1, the audio processing application 120 is now described using the examples in FIGS. 2-7. The audio processing application 120 determines the orientation of each wall within the acoustic environment with respect to each audio processing device 100 in the acoustic environment. For example, Table 300 of FIG. 3 shows the column for wall 202*a* displays the orientation of wall 202*a* with respect to audio processing devices 204*a*, 204*b*, 204*c*, and 204*d*, based on the acoustic environment 200 in FIG. 2. The other columns of Table 300 shows the orientations of the other walls in the use case acoustic environment 200 of FIG. 2 with respect to the audio processing devices audio processing devices 204*a*, 204*b*, 204*c*, and 204*d*. The term "Front" means that the device is facing the wall in question. The term "Back" means that the device is facing away from the wall in question. The term "Left" means that the wall is to the left direction of the device. The term "Right" means that the wall is to the right direction of the device.

FIG. 3 is a conceptual illustration of an example table detailing the direction of walls based on device orientation, according to various embodiments. As shown, Table 300 displays the direction of each wall in the acoustic environment 200 of FIG. 2 with respect to each device in the acoustic environment 200. The audio processing application 120 can use the device location data 122 to determine the orientations of each wall with respect to each device.

As shown, audio processing device 204*a* is labeled as the ordinal device in acoustic environment 200. Wall 202*a* is the Front wall with respect to audio processing devices 204*a* and 204*b* and the Back wall with respect to audio processing device 204*c* and 204*d*. The audio processing application 120 of audio processing device 204*a* determines that Wall 202*b* is the Left wall with respect to audio processing device 204*a* and 204*b* and the Right wall with respect to audio processing device 204*c* and 204*d*. The audio processing application 120 of audio processing device 204*a* determines that Wall 202*c* is the Back wall with respect to audio processing device 204*a* and 204*b* and the Front wall with respect to audio processing device 204*c* and 204*d*. The audio processing application 120 of audio processing device 204*a* determines that Wall 202*d* is the Right wall with respect to audio processing device 204*a* and 204*b* and the Left wall with respect to audio processing device 204*c* and 204*d*.

FIG. 4 is a conceptual illustration of example ground truth room layout matrices, according to various embodiments. As shown, matrices 400*a* and 400*b* are the ground truth values for the distance and confidence scores, respectively of each wall with respect to each audio processing device 204*a*-204*d* in acoustic environment 200. The values in the matrix 400*a* are the true distances in meters (m) from each respective wall to each respective device. The values in the matrix 400*b* are all equal to 1.0 because the confidence score for a true distance is always 1.0.

Referring back to FIG. 1, the audio processing application 120 generates a room layout matrix (RLM) 130 and arranges the WDE 126 per audio processing device 100 within the acoustic environment in decreasing order of confidence scores within the RLM 130. In various embodiments, only the top n confidence scores for each audio processing device 100 are used in the RLM 130, where n is equal to the number of non-ceiling, non-floor, walls within the acoustic environment. For example, in an acoustic environment with four non-ceiling, non-floor walls, the top four confidence scores are used to populate the RLM 130. In some embodiments, if the audio processing application 120 determines that all rows or all columns of the RLM 130 are zero, the audio processing application 120 raises an error flag. RLM 500*a* and 500*b* in FIG. 5 shows an example of a sorted RLM for four devices in an acoustic environment that has four non-ceiling, non-floor walls. The labels for the wall columns in the RLM 130 start as placeholder labels Wall W, X, Y, and Z. The following techniques help disambiguate which walls of the acoustic environment should be associated with which WDE.

FIG. 5 is a conceptual illustration of example sorted room layout matrices, according to various embodiments RLM 500*a* represents the computed WDEs 126 of each audio processing device 204*a*-204*d* in the acoustic environment 200 sorted in decreasing order based on the associated confidence scores 124. The columns of the RLM 500*a* include place holder labels Wall W, X, Y, and Z until the walls associated with each WDE are determined by the audio processing application 120. The RLM 500*b* represents the computed confidence scores associated with the WDEs 126 in the RLM 500*a*, also in decreasing order per device. The values in RLM 500*a* are represented in meters for exemplary purposes only and is not meant to be limiting in any way. Any measuring unit is acceptable. The values in RLM 500*b* are represented as a range between 0.0 and 1.0 where 0.0 is the lowest confidence score possible and 1.0 is the highest confidence score possible. The values in RLM 500*a* and 500*b* are used by the audio processing device 204*a* to determine the room layout estimates of the acoustic environment 200.

Referring back to FIG. 1, the audio processing application 120 determines that one or more audio processing devices in the RLM 130 have a different orientation than the ordinal device. If the audio processing application 120 determines that a device has a different orientation than the ordinal device, then the audio processing application 120 circularly shifts the values in that device's row by one place to the right per 90-degree difference in orientation compared to the ordinal device. For example, in RLM 600*a* the audio processing application 120 determines that audio processing device 204*c* is rotated 180-degrees with respect to audio processing device 204*a* (the ordinal device) based on the device location data 122. In this example, the audio processing device shifts the values in the row associated with the device 204*c* by two places to the right (e.g., one spot to the right per 90-degree rotational difference).

Once each row properly represents the correct wall with respect to the orientation of each device, the audio processing application 120 reorders the values in each row of the RLM based on the associated confidence scores. For example, with respect to the orientations in Table 300, the WDE associated with the highest confidence score is placed in the Front wall column for each device. The WDE associated with the lowest confidence score is placed in the Back wall column for each device. The WDE associated with the second highest confidence score is placed in the Left wall column for devices 204*a* and 204*c* and the Right wall column for devices 204*b* and 204*d*. The WDE associated with the third highest confidence score is placed in the Right wall column for devices 204*a* and 204*c* and the Left wall column for devices 204*b* and 204*d*.

Additionally, the audio processing application 120 removes certain outliers from the matrix 600*a* based on the outlier determination techniques disclosed herein. For example, as shown in acoustic environment 200, audio processing device 204*c* is between audio processing device 204*d* and wall 202*d*. If the distance between audio processing device 204*d* and 204*c* is 2 m, it would be physically impossible for the wall 202*d* to be less than 2 m away from audio processing device 204*a*. Therefore, the audio processing application 120 can use the device location data 122 to determine that the WDE with the value of 2 m associated with audio processing device 204*d* in RLM 500*a*, which is associated with the confidence of 0.72 in the RLM 500*d*, cannot be associated with walls 202*d*. A similar analysis can be computed by the audio processing application 120 with respect to wall 202*a* using the device location data 122 with respect to audio processing device 204*a*. Since the WDE with the value of 2 m is associated with a lower confidence score than the other WDEs associated with audio processing device 204*d*, and cannot be associated with wall 202*a* or wall 202*d*, the audio processing application identifies the WDE as an outlier and removes it from the RLM.

Once the outliers are removed from RLM 130, the audio processing application determines the final WDE for each wall with respect to the orientation of the ordinal device. For example, from the perspective of the ordinal audio processing device 204*a*, wall 202*a* is the Front wall, wall 202*b* is the Left wall, wall 202*c* is the Back wall, and wall 202*d* is the Right wall. To determine the final WDE for each wall, the audio processing application 120 determines the WDE with the highest confidence score in each wall column. For example, for the column representing wall 202*a* in RLM 600*a*, the audio processing application 120 determines the WDE associated with the highest confidence score is associated with the audio processing device 204*a*. Because audio processing device 204*a* is the ordinal device, the WDE of 3.9 m is the finalized distance and no other computations are necessary. In another example, for the column representing wall 202*d* in RLM 600*a*, the audio processing application 120 determines the WDE of 1.0 m is associated with the highest confidence score, 0.68, but is associated with a non-ordinal device. Because the WDE of 1.0 m and confidence score of 0.68 is associated with audio processing device 204*b* and not the ordinal device (audio processing device 204*a*), the audio processing application 120 uses the device location data 122 to determine the finalized WDE. For example, if the audio processing device 204*b* is 1.0 meter away from the ordinal device in the direction towards the wall 202*d*, and audio processing device 204*b* is closer to the wall 202*d* than the ordinal device, as shown in acoustic environment 200, the audio processing application 120 calculates the final distance value of wall 202*d* by adding the WDE of 1.0 m by the distance between audio processing device 204*b* and the ordinal device in the direction of the wall 202*d*. In some embodiments, the distance between two devices in the direction of the wall is zero. For example, for the column representing wall 202*b* in RLM 600*a*, the audio processing application 120 determines the WDE of 1.0 m is associated with the highest confidence score, 0.94, but is associated with a non-ordinal device. Because the WDE of 1.0 m and confidence score of 0.94 is associated with audio processing device 204*d* and not the ordinal device (audio processing device 204*a*), the audio processing application 120 uses the device location data 122 to determine the finalized WDE. For example, as shown in acoustic environment 200, the audio processing device 204*d* is equidistant with the ordinal device in the regards to the wall 202*b*. Therefore, the audio processing application 120 calculates the final WDE of wall 202*b* by subtracting or adding 0.0 m from the WDE of 1.0 m. This process can repeat for each wall in the acoustic environment.

FIG. 6 is a conceptual illustration of example final room layout matrices, according to various embodiments. The RLM 600*a* displays the orientation of each wall with respect to each device as well as the WDE 126 associated with each wall with respect to each device. The values in each RLM 600*a* and 600*b* are based on one or more operations performed by the audio processing application 120 of the ordinal device onto the values in the RLM 500*a* and 500*b* of FIG. 5, respectively. For example, the audio processing application 120 shifts the WDEs 126 in RLM 500*a* based on the orientation of each wall with respect to each device, as shown in Table 300 of FIG. 3. Furthermore, the audio processing application 120 then reorders the WDEs in each row based on the associated confidence scores in RLM 500*b*. Additionally, the audio processing application 120 removes certain outliers from the matrix 600*a* based on the outlier determination techniques disclosed herein. For example, as shown in acoustic environment 200, audio processing device 204*c* is between audio processing device 204*d* and wall 202*d*. If the distance between audio processing device 204*d* and 204*c* is 2 meters, it would be physically impossible for the wall 202*d* to be less than 2 meters away from audio processing device 204*a*. Therefore, the audio processing application 120 can use the device location data 122 to determine that the WDE with the value of 2 meters associated with audio processing device 204*d* and wall 202*d* in RLM 500*a*, which is associated with the confidence of 0.72 in the RLM 500*d*, cannot be used to estimate a distance to wall 202*d*. A similar analysis can be computed by the audio processing application 120 with respect to wall 202*a* using the device location data 122 with respect to audio processing device 204*a*. Because the WDE with the value of 2 meters is associated with a lower confidence score than the other WDEs associated with audio processing device 204*d*, and cannot be associated with wall 202*a* or wall 202*d*, the audio processing application identifies the WDE as an outlier and removes it from the RLMs 600*a* and 600*b*.

Referring back to FIG. 1, once a final WDE relative to the ordinal device has been calculated for each wall, the audio processing application 120 determines the room layout estimates of the acoustic environment, such as the length, width, height, and volume of the acoustic environment. The audio processing application 120 determines the length of the acoustic environment by adding the distance from the ordinal device to the Front wall with the distance from the ordinal device to the Back wall. The audio processing application 120 determines the width of the acoustic environment by adding the distance from the ordinal device to Left wall with the distance from the ordinal device to the Right wall. The audio processing application 120 determines the height of the acoustic environment by adding the WDE associated with the ceiling with the distance the ordinal device is set off the ground, which is determined from the device layout data 122. The audio processing application 120 determines the volume of the acoustic environment by multiplying the length of the acoustic environment by the width of the acoustic environment and the height of the acoustic environment.

Figure 7:
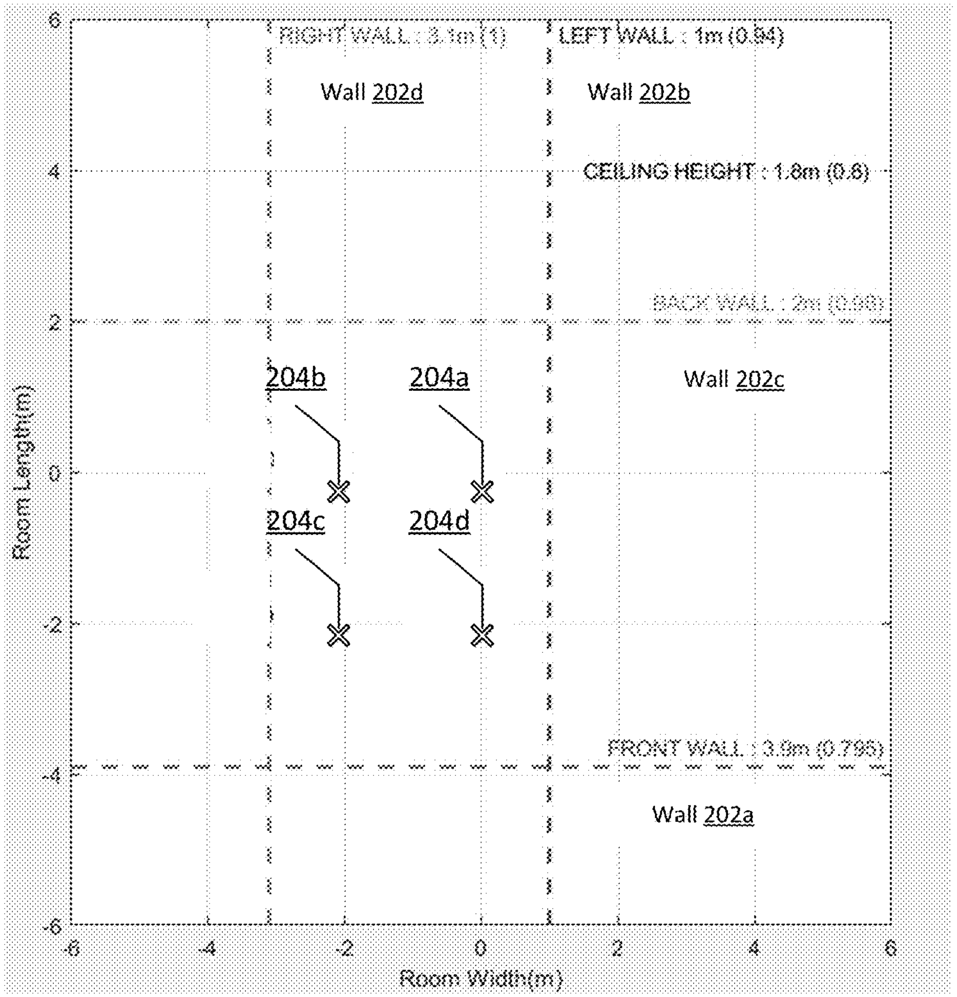
FIG. 7 is a conceptual illustration of an example table describing the distance of each wall from an example ordinal device and a chart mapping the each wall around the devices in an example acoustic environment, according to various embodiments.

FIG. 7 is a conceptual illustration of an example table describing the distance of each wall from an example ordinal device and a chart mapping the each wall around the devices in an example acoustic environment, according to various embodiments. Table 700*a* displays the finalized WDE for each wall with respect to the ordinal device based on the WDE associated with the highest confidence score in the RLM 600*a* and 600*b* across all devices. For example, for the column representing wall 202*a* in RLM 600*a*, the audio processing application 120 determines the WDE associated with the highest confidence score is associated with the audio processing device 204*a*. Because audio processing device 204*a* is the ordinal device, the WDE of 3.9 m is the finalized distance and no other computations are necessary. In another example, for the column representing wall 202*d* in RLM 600*a*, the audio processing application 120 determines the WDE of 1.0 m is associated with the highest confidence score, 0.68, but is associated with a non-ordinal device. Because the WDE of 1.0 m and confidence score of 0.68 is associated with audio processing device 204*b* and not the ordinal device (audio processing device 204*a*), the audio processing application 120 uses the device location data 122 to determine the finalized WDE. For example, if the audio processing device 204*b* is 1.0 meter away from the ordinal device in the direction towards the wall 202*d*, and audio processing device 204*b* is closer to the wall 202*d* than the ordinal device, as shown in acoustic environment 200, the audio processing application 120 calculates the final distance value of wall 202*d* by adding the WDE of 1.0 m to the distance between audio processing device 204*b* and the ordinal device in the direction of the wall 202*d*. This process repeats for each wall in the acoustic environment. An example of the finalized WDE estimates relative to the ordinal device are shown in Chart 700*b*.

Once the finalized WDEs are calculated, the audio processing application 120 determines the room layout estimates based on the finalized wall estimates in Table 700*a*. For example, the audio processing application 120 determines the room length estimate is 5.9 m based on adding the Front wall estimate of 3.9 m with the Back wall estimate of 2.0 m (4.0 m minus the distance between audio processing device 204*d* and 204*a* in the direction of the Back wall). The audio processing application 120 determines the room width estimate is 4.1 m based on adding the Left wall estimate of 1.0 m (1.0 m minus the distance between audio processing device 204*d* and 204*a* in the direction of the Left wall) with the Right wall estimate of 3.1 meters (1.0 m plus the distance between the audio processing device 204*b* and 204*a* in the direction of the Right wall). The audio processing application 120 determines the room height estimate is 2.8 m based on adding the ceiling distance estimate of 1.8 meters with the floor distance estimate of 1 m. The values of the ceiling estimate and elevation are based on extracting the ceiling estimate and floor estimate when determining the valid set of WDEs 126. The audio processing application 120 determines the room estimate volume is 67.73 m based on multiplying the room estimate length of 5.9 m by the room estimate width of 4.1 m by the room estimate height of 2.8 m.

Method of Determining Wall Distance Estimates

Figure 8:
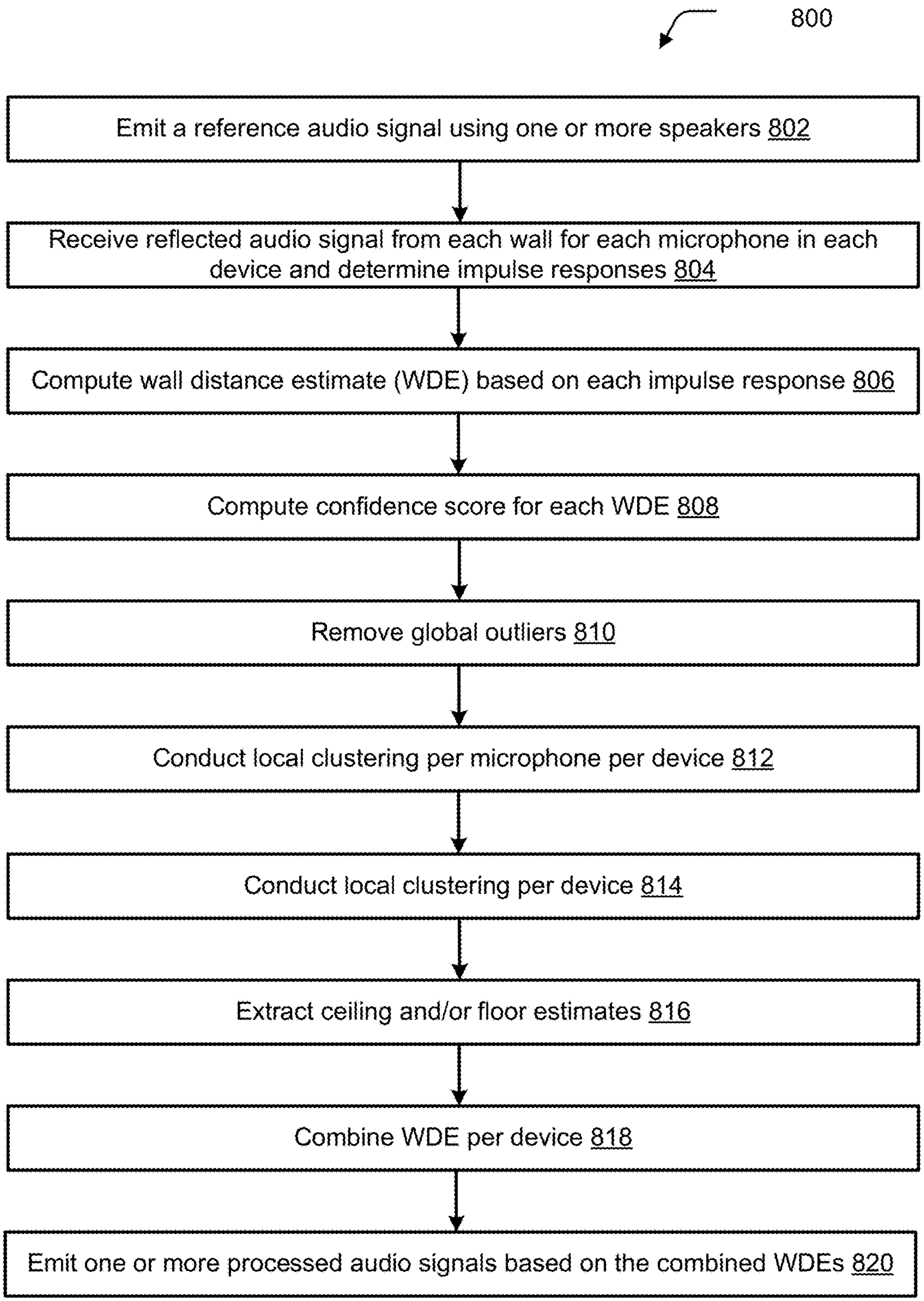
FIG. 8 is flowchart of method steps for determining wall distance estimates of an acoustic environment, according to various embodiments.

FIG. 8 sets forth a flow diagram of method steps for determining wall distance estimates of an acoustic environment. Although the method steps are described with reference to the systems of FIGS. 1-7, persons skilled in the art will understand that any system configured to implement the method steps, in any order, falls within the scope of the present invention.

As shown, a method 800 begins at step 802, where the audio processing application 120 of each audio processing device 100 in the acoustic environment emits a reference audio signal using the one or more speakers 160. In some embodiments, the reference audio signal can be a sine sweep, or any other reference audio signal that reflects off the walls of the acoustic environment and in turn, can be received as an impulse response by the microphone pair 150.

At step 804, each microphone in the microphone pair 150 of each audio processing device 100 receives a reflected audio signal from the acoustic environment. The audio processing application 120 determines an impulse response based on the reflected audio signal. The impulse response represents the reaction of the acoustic environment to the reference audio signal expressed as function of time. In some embodiments, the microphones in the microphone pair 150 can be instructed to listen for reflected audio signals by the audio processing application 120 of the audio processing device 100 in response to emitting the reference audio signal.

At step 806, the audio processing application 120 of each audio processing device 100 computes a WDE based on each impulse response received by the microphones of the microphone pair 150 for that audio processing device 100. The WDEs are stored in each audio processing device 100 as WDEs 126. The audio processing application 120 generates WDEs 126, by generating estimated peak distances from a wall of the acoustic environment to a microphone of the microphone pair 150 as a function of the speed of sound and the peak amplitude of the impulse response. Each WDE is associated with the microphone used in calculating the peak distance and is associated with the audio processing device 100 that includes the microphone. Each WDE can be represented as a measuring unit, such as meters, feet, or any other measuring metric. The WDEs 126 can be stored in memory 114 of the audio processing device 100. In some embodiments, the WDEs 126 can include other WDEs derived from other audio processing devices 100 in the acoustic environment that were sent to the audio processing device 100.

At step 808, the audio processing application 120 of each audio processing device 100 computes a confidence score for each WDE. A confidence score is a metric that represents the likelihood that a corresponding WDE accurately represents the actual distance from an audio processing device to a wall of the acoustic environment. The confidence score can be computed based on the peak amplitude of peaks from the impulse responses. For example, a confidence score of 1.0 represents the highest confidence and a confidence score of 0.0 represents the lowest confidence. The confidence scores can be stored in memory 114 of the audio processing device 100 as confidence score data 124. Confidence scores data 124 can include confidence scores of WDEs from other audio processing device(s) 100 in the acoustic environment. The audio processing application 120 can generate WDE confidence pairs 128 by associating each WDE in the WDE 126 with the respective confidence score in confidence score data 124.

At step 810, the audio processing application 120 removes global outliers from WDEs 126 based on various tunable thresholds and confidence score data 124. For example, if a given WDE 126 is less than a minimum wall distance threshold or greater than a maximum wall distance threshold, the given WDE is removed. In another example, if a given WDE 126 is associated with a confidence score that is less than a minimum confidence threshold, the given WDE 126 is removed from WDEs 126. The threshold used can be a pre-determined threshold.

At step 812, the audio processing application 120 clusters WDEs for each microphone in the microphone pair 150. One example of clustering is clustering WDEs 126 based on the associated microphone in the microphone pair 150 of each audio processing device 100. For instance, if the difference in distance between two or more WDEs associated with the same microphone in the microphone pair 150 is less than a minimum distance threshold, each WDE except for the WDE associated with the highest confidence score is removed from WDEs 126. In some embodiments, the confidence score associated with the remaining WDEs 126 can be averaged with the other confidences scores of the removed WDEs. The minimum distance threshold can be a pre-defined threshold.

At step 814, the audio processing application 120 clusters WDEs for both microphones in the microphone pair 150 per audio processing device 100. Another example of clustering is clustering WDEs 126 based on different associated microphones in the microphone pair 150 of the same audio processing device 100. For instance, if the difference in distance between two or more WDEs 126 associated with different microphones of the microphone pair 150 in the same audio processing device 100 is less than a minimum distance threshold, the WDEs are determined to be "valid estimates."

At step 816, the audio processing application 120 can identify and extract WDEs that represent the ceiling and or the floor of the acoustic environment. One example of identifying and extracting the ceiling and/or the floor estimate is to compute the mode of the each of WDEs 126 identified by each of the audio processing devices 100 in the acoustic environment. For instance, the audio processing application 120 computes the mode of the WDEs 126. If the associated confidence score of each WDE equal to the mode is greater than a minimum confidence threshold, one WDE of the mode can be identified as the "ceiling estimate" or "floor estimate" and the remaining WDEs are removed. The minimum confidence threshold can be a pre-defined threshold.

At step 818, the audio processing application 120 combines the remaining WDEs 126 for both microphones in the microphone pair 150 that are separated by a distance that is less than a minimum distance threshold in no particular order of confidence score. The combined or unified WDEs 126 accurately represent each wall of the acoustic environment. These combined or unified WDEs 126 accurately represent each wall of the acoustic environment from the perspective of the associated audio processing device 100.

At step 820, the audio processing application 120 determines an acoustic model of the acoustic environment based on the combined or unified WDEs 126. The audio processing application 120 processes one or more audio signals using the acoustic model. The audio processing application 120 emits the one or more processed audio signals based on the combined or unified WDEs 126 using the one or more speakers 160.

Method of Determining Room Layout Estimates

Figure 9:
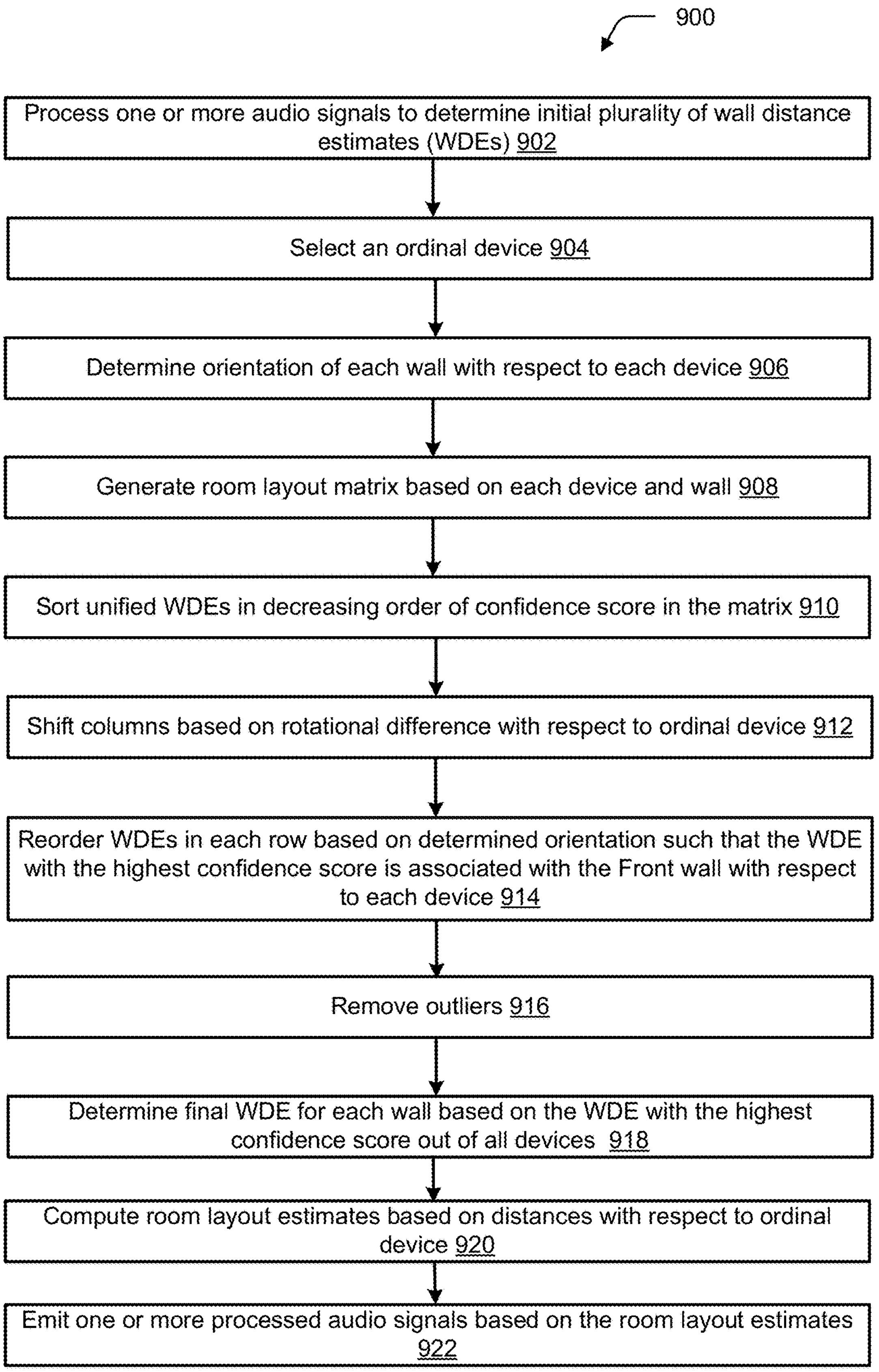
FIG. 9 is flowchart of method steps for determining room layout estimates of an acoustic environment, according to various embodiments.

FIG. 9 sets forth a flow diagram of method steps for determining room layout estimates of an acoustic environment. Although the method steps are described with reference to the systems of FIGS. 1-7, persons skilled in the art will understand that any system configured to implement the method steps, in any order, falls within the scope of the present invention.

As shown, a method 900 begins at step 902, where the audio processing application 120 of each audio processing device 100 processes one or more audio signal based on the WDEs 126, to determine the initial WDEs 126, which accurately represent each wall of the acoustic environment from the perspective of each associated audio processing device 100 in the acoustic environment. For example, the steps of FIG. 8 can be used to determine the initial WDEs 126 used in method 900, but it not meant to be limiting.

At step 904, the audio processing application 120 of one audio processing device 100 in the acoustic environment selects one of the audio processing devices 100 to be an ordinal device. Any of the audio processing devices 100 in the acoustic environment can be the ordinal device. The ordinal device is defined as the reference device where the center of the device is treated as the origin of the room layout of the acoustic environment.

At step 906, the audio processing application 120 determines the orientation of each wall in the acoustic environment with respect to each audio processing device 100 in the acoustic environment. The orientation of each wall can be Front, Left, Back or Right. The term "Front" means that the device is facing the wall in question. The term "Back" means that the device is facing away from the wall in question. The term "Left" means that the wall is to the left direction of the device. The term "Right" means that the wall is to the right direction of the device. For example, Table 300 of FIG. 3 shows the column for wall 202*a* displays the orientation of wall 202*a* with respect to audio processing devices 204*a*, 204*b*, 204*c*, and 204*d*, based on the acoustic environment 200 in FIG. 2. The other columns of Table 300 shows the orientations of the other walls in the use case acoustic environment 200 of FIG. 2 with respect to the audio processing devices audio processing devices 204*a*, 204*b*, 204*c*, and 204*d*.

At step 908, the audio processing application 120 generates a room layout matrix, such as RLM 130, based on each audio processing device 100 in the acoustic environment and each wall in the acoustic environment. In various embodiments, only the top n confidence scores for each audio processing device 100 are used in the RLM 130, where n is equal to the number of non-ceiling, non-floor, walls within the acoustic environment. For example, in an acoustic environment with four non-ceiling, non-floor walls, the top four confidence scores are used to populate the RLM 130. In some embodiments, if the audio processing application 120 determines that all rows or all columns of the RLM 130 are zero, the audio processing application 120 raises an error flag. RLM 500*a* and 500*b* in FIG. 5 shows an example of a sorted RLM for four devices in an acoustic environment that has four non-ceiling, non-floor walls. The labels for the wall columns in the RLM 130 start as placeholder labels Wall W, X, Y, and Z. The following techniques help disambiguate which walls of the acoustic environment should be associated with which WDE.

At step 910, the audio processing application 120 sorts the unified WDEs, such as WDEs 126, in decreasing confidence score, based on confidence score data 124, and places the sorted WDEs into the room layout matrix. In various embodiments, only the top n confidence scores for each audio processing device 100 are used in the RLM 130, where n is equal to the number of non-ceiling, non-floor, walls within the acoustic environment. For example, in an acoustic environment with four non-ceiling, non-floor walls, the top four confidence scores are used to populate the RLM 130. In some embodiments, if the audio processing application 120 determines that all rows or all columns of the RLM 130 are zero, the audio processing application 120 raises an error flag.

At step 912, the audio processing application 120 shifts the columns of the room layout matrix based on the rotational difference of each device with respect to the ordinal device. The rotational difference can be determined based on the device location data 122. For example, if the audio processing application 120 determines that a non-ordinal device has a different orientation than the ordinal device, then the audio processing application 120 circularly shifts the values in that device's row of the RLM 130 by one place to the right per 90-degree difference in orientation compared to the ordinal device.

At step 914, the audio processing application 120 reorders each WDE in each row of the room layout matrix based on the determined orientation of the device corresponding to that row, such that the WDE with the highest confidence score is placed in the column associated with the Front wall with respect to the device. For example, with respect to the orientations in Table 300, the WDE associated with the highest confidence score is placed in the Front wall column for each device. The WDE associated with the lowest confidence score is placed in the Back wall column for each device. Because some devices face opposite directions, the walls associated with the second highest and third highest confidence score can change. For example, as shown in RLM 600*a* of FIG. 6, the WDE associated with the second highest confidence score is placed in the Left wall column for devices 204*a* and 204*c* and the Right wall column for devices 204*b* and 204*d*. The WDE associated with the third highest confidence score is placed in the Right wall column for devices 204*a* and 204*c* and the Left wall column for devices 204*b* and 204*d*.

At step 916, the audio processing application 120 removes outlier WDEs from the RLM 130. The removal of outliers can be based on a multi-dimensional scaling approach. The removal of outliers can be based on the device location data 122. For example, as shown in acoustic environment 200, audio processing device 204*c* is between audio processing device 204*d* and wall 202*d*. If the distance between audio processing device 204*d* and 204*c* is 2 m, it would be physically impossible for the wall 202*d* to be less than 2 m away from audio processing device 204*a*. Therefore, the audio processing application 120 can use the device location data 122 to determine that the WDE with the value of 2 m associated with audio processing device 204*d* in RLM 500*a*, which is associated with the confidence of 0.72 in the RLM 500*d*, cannot be associated with walls 202*d*. A similar analysis can be computed by the audio processing application 120 with respect to wall 202*a* using the device location data 122 with respect to audio processing device 204*a*. Because the WDE with the value of 2 m is associated with a lower confidence score than the other WDEs associated with audio processing device 204*d*, and cannot be associated with wall 202*a* or wall 202*d*, the audio processing application identifies the WDE as an outlier and removes the WDE and associated confidence score from the RLMs, as shown by the absence of the WDE and confidence score in RLM 600*a* and 600*b*, respectively, of FIG. 6.

At step 918, the audio processing application 120 determines the final WDE for each wall based on the WDE with the highest confidence score out of all audio processing devices 100 in the acoustic environment. For example, based on the acoustic environment 200, from the perspective of the ordinal audio processing device 204*a*, wall 202*a* is the Front wall, wall 202*b* is the Left wall, wall 202*c* is the Back wall, and wall 202*d* is the Right wall. To determine the final WDE for each wall, the audio processing application 120 determines the WDE with the highest confidence score in each wall column. For example, for the column representing wall 202*a* in RLM 600*a*, the audio processing application 120 determines the WDE associated with the highest confidence score is associated with the audio processing device 204*a*. Because audio processing device 204*a* is the ordinal device, the WDE of 3.9 m is the finalized distance and no other computations are necessary. In another example, for the column representing wall 202*d* in RLM 600*a*, the audio processing application 120 determines the WDE of 1.0 m is associated with the highest confidence score, 0.68, but is associated with a non-ordinal device. Because the WDE of 1.0 m and confidence score of 0.68 is associated with audio processing device 204*b* and not the ordinal device (audio processing device 204*a*), the audio processing application 120 uses the device location data 122 to determine the finalized WDE. For example, if the audio processing device 204*b* is 1.0 meter away from the ordinal device in the direction towards the wall 202*d*, and audio processing device 204*b* is closer to the wall 202*d* than the ordinal device, as shown in acoustic environment 200, the audio processing application 120 calculates the final distance value of wall 202*d* by adding the WDE of 1.0 m by the distance between audio processing device 204*b* and the ordinal device in the direction of the wall 202*d*. In some embodiments, the distance between two devices in the direction of the wall is zero. For example, for the column representing wall 202*b* in RLM 600*a*, the audio processing application 120 determines the WDE of 1.0 m is associated with the highest confidence score, 0.94, but is associated with a non-ordinal device. Because the WDE of 1.0 m and confidence score of 0.94 is associated with audio processing device 204*d* and not the ordinal device (audio processing device 204*a*), the audio processing application 120 uses the device location data 122 to determine the finalized WDE. For example, as shown in acoustic environment 200, the audio processing device 204*d* is equidistant with the ordinal device in the regards to the wall 202*b*. Therefore, the audio processing application 120 calculates the final WDE of wall 202*b* by subtracting or adding 0.0 m from the WDE of 1.0 m. This process can repeat for each wall in the acoustic environment.

At step 920, the audio processing application 120 computes the room layout estimates of the acoustic environment, such as the length, width, height, and volume of the acoustic environment. The audio processing application 120 determines the length of the acoustic environment by adding the distance from the ordinal device to the Front wall with the distance from the ordinal device to the Back wall. The audio processing application 120 determines the width of the acoustic environment by adding the distance from the ordinal device to Left wall with the distance from the ordinal device to the Right wall. The audio processing application 120 determines the height of the acoustic environment by adding the WDE associated with the ceiling with the WDE associated with the floor. The audio processing application 120 determines the volume of the acoustic environment by multiplying the length of the acoustic environment by the width of the acoustic environment and the height of the acoustic environment.

At step 922, the audio processing application 120 determines an acoustic model of the acoustic environment based on the room layout estimates. The audio processing application 120 processes one or more audio signals using the acoustic model. The audio processing application 120 emits the one or more processed audio signals based on the room layout estimates using the one or more speakers 160.

In sum, the disclosed techniques allow an audio processing system to accurately estimate the wall distances of an acoustic environment in which the devices are located in. A speaker in each device transmits a reference audio signal, such as a sine sweep, and in response a microphone pair in each device receives impulse responses from each wall of the acoustic environment. The audio processing system computes a wall distance estimate (WDE) for each wall, including the ceiling and floor, based on the peak distance the impulse response traveled from the wall to each microphone in the microphone pair, resulting in six WDEs for each microphone of each device. The audio processing system computes a confidence score for each wall, including the ceiling and floor. The audio processing system removes outliers, clusters the estimates, removes repeated estimates, and extracts the ceiling and floor estimates. The audio processing system combines the remaining WDEs for each microphone of each device along with the confidence score to determine accurate, unified WDEs for each device.

In some embodiments, the audio processing system combines the unified WDEs for each device with device distance estimates to determine the room layout of the acoustic environment. The audio processing system chooses a device to be the ordinal device. The audio processing system determines the orientation of each wall within the acoustic environment with respect to each device in the acoustic environment. The audio processing system creates a room layout matrix where the rows are associated with the devices in the acoustic environment and the columns are associated with the walls of the acoustic environment. The audio processing system sorts the unified WDEs, starting with the ordinal device, in decreasing order of confidence scores and places the WDEs in the room layout matrix. If one or more of the devices has a different orientation with respect to the acoustic environment compared to the ordinal device, then the audio processing system shifts the values in the row for that device by one place to the right per 90-degree difference in orientation compared to the ordinal device. The audio processing system reorders the WDEs in each row based on the determined orientation of each wall with respect to each device such that the WDE with the highest confidence score for each device is associated with the Front wall of that device. The audio processing system removes outlier WDEs. The audio processing system computes the final WDE for each wall based on the WDE for that wall with the highest confidence score out of all devices. The audio processing system computes the room layout estimates based on the final WDE distances with respect to the ordinal device.

At least one technical advantage of the disclosed techniques relative to the prior art is that, with the disclosed techniques, an audio system can accurately estimate the wall boundaries of a room with minimum setup. The disclosed techniques are not impacted by the relative position of the devices of the audio system in the room allowing for more flexible placement of the devices to estimate the boundaries and layout of a room. Additionally, the audio system does not need to be equipped with a camera or image processing software. Furthermore, the estimated room layout results in a better acoustic model of the room and a corresponding improvement in the quality of sound output by the audio system. These technical advantages provide one or more technological improvements over prior art approaches.

1. In some embodiments, a computer-implemented method comprises emitting a reference audio signal using one or more speakers of an audio processing device located in an acoustic environment; receiving, by each microphone in a microphone pair of the audio processing device, a response of the acoustic environment to the reference audio signal; determining an impulse response of the acoustic environment based on the reference audio signal and the received response of the acoustic environment; determining, based on the impulse response, a plurality of candidate wall distance estimates and a plurality of confidence scores, each confidence score of the plurality of confidence scores associated with a different candidate wall distance estimate of the plurality of candidate wall distance estimates; and determining based on the plurality of candidate wall distance estimates, the plurality of confidence scores, and candidate wall distance estimates and confidence scores received from one or more other audio processing devices, a set of wall distance estimates, each wall distance estimate in the set of wall distance estimates being associated with a different wall in a plurality of walls in the acoustic environment.
2. The computer-implemented method of clause 1, wherein determining the set of wall distance elements comprises clustering the plurality of candidate wall distance estimates associated with a first microphone in the microphone pair.
3. The computer-implemented method of clause 2, wherein clustering the plurality of candidate wall distance estimates associated with the first microphone comprises: determining that a first candidate wall distance estimate of the plurality of candidate wall distance estimates associated with the first microphone is within a threshold distance from a second candidate wall distance estimate of the plurality of candidate wall distance estimates associated with the first microphone; and removing the first candidate wall distance estimate from the plurality of candidate wall distance estimates.
4. The computer-implemented method of clause 3, wherein removing the first candidate wall distance estimate from the plurality of candidate wall distance estimates comprises: determining that a confidence score associated with the second candidate wall distance estimate is higher than a confidence score associated with the first candidate wall distance estimate; and determining, based on averaging the confidence score associated with the first candidate wall distance estimate and the confidence score associated with the second candidate wall distance estimate, a new confidence score associated with the second candidate wall distance estimate.
5. The computer-implemented method of clauses 1-4, wherein determining the set of wall distance estimates comprises clustering the plurality of candidate walls distance estimates associated with different microphones in the microphone pair together.
6. The computer-implemented method of clause 5, wherein clustering the plurality of candidate wall distance estimates associated with the different microphones comprises: determining that a first candidate wall distance estimate of the plurality of candidate wall distance estimates associated with a first microphone in the microphone pair is within a threshold distance from a second candidate wall distance estimate of the plurality of candidate wall distance estimates associated with a second microphone in the microphone pair; and determining the set of wall distance estimates includes at least one of the first candidate wall distance estimate of the plurality of candidate wall distance estimates associated with the first microphone or the second candidate wall distance estimate of the plurality of candidate wall distance estimates associated with the second microphone.
7. The computer-implemented method of clauses 1-6, further comprising: determining a most common wall distance estimate in the plurality of candidate wall distance estimates and the candidate wall distance estimates received from the one or more other audio processing devices; and identifying the most common wall distance estimate as a ceiling distance estimate.
8. The computer-implemented method of clauses 1-7, wherein the reference audio signal comprises a sine sweep.
9. The computer-implemented method of clauses 1-8, wherein the audio processing device and the other audio processing devices are located at a same height from a floor of the acoustic environment.
10. The computer-implemented method of clauses 1-9, wherein the candidate wall distance estimates and confidence scores received from a second audio processing device of the one or more other audio processing devices are based on one or more other impulse responses determined by the second audio processing device.
11. The computer-implemented method of clauses 1-10, further comprising: determining, based on the set of wall distance estimates, an acoustic model of the acoustic environment; processing one or more audio signals using the acoustic model; and emitting the one or more processed audio signals using the one or more speakers.
12. In some embodiments, one or more non-transitory computer-readable media including instructions that, when executed by one or more processors, cause the one or more processors to perform the steps of: emitting a reference audio signal using one or more speakers of an audio processing device located in an acoustic environment; receiving, by each microphone in a microphone pair of the audio processing device, a response of the acoustic environment to the reference audio signal; determining an impulse response of the acoustic environment based on the reference audio signal and the received response of the acoustic environment; determining, based on the impulse response, a plurality of candidate wall distance estimates and a plurality of confidence scores, each confidence score of the plurality of confidence scores associated with a different candidate wall distance estimate of the plurality of candidate wall distance estimates; and determining based on the plurality of candidate wall distance estimates, the plurality of confidence scores, and candidate wall distance estimates and confidence scores received from one or more other audio processing devices, a set of wall distance estimates, each wall distance estimate in the set of wall distance estimates being associated with a different wall in a plurality of walls in the acoustic environment.

13. The one or more non-transitory computer-readable media of clause 12, wherein the step of determining the set of wall distance elements comprises clustering the plurality of candidate wall distance estimates associated with a first microphone in the microphone pair.

14. The one or more non-transitory computer-readable media of clause 13, wherein step of clustering the plurality of candidate wall distance estimates associated with the first microphone comprises: determining that a first candidate wall distance estimate of the plurality of candidate wall distance estimates associated with the first microphone is within a threshold distance from a second candidate wall distance estimate of the plurality of candidate wall distance estimates associated with the first microphone; and removing the first candidate wall distance estimate from the plurality of candidate wall distance estimates.

15. The one or more non-transitory computer-readable media of clause 14, wherein the step of removing the first candidate wall distance estimate from the plurality of candidate wall distance estimates comprises: determining that a confidence score associated with the second candidate wall distance estimate is higher than a confidence score associated with the first candidate wall distance estimate; and determining, based on averaging the confidence score associated with the first candidate wall distance estimate and the confidence score associated with the second candidate wall distance estimate, a new confidence score associated with the second candidate wall distance estimate.

16. The one or more non-transitory computer-readable media of clauses 12-15, wherein the step of determining the set of wall distance estimates comprises clustering the plurality of candidate walls distance estimates associated with different microphones in the microphone pair together.

17. The one or more non-transitory computer-readable media of clause 16, wherein the step of clustering the plurality of candidate wall distance estimates associated with the different microphones comprises: determining that a first candidate wall distance estimate of the plurality of candidate wall distance estimates associated with a first microphone in the microphone pair is within a threshold distance from a second candidate wall distance estimate of the plurality of candidate wall distance estimates associated with a second microphone in the microphone pair; and determining the set of wall distance estimates includes at least one of the first candidate wall distance estimate of the plurality of candidate wall distance estimates associated with the first microphone or the second candidate wall distance estimate of the plurality of candidate wall distance estimates associated with the second microphone.

18. The one or more non-transitory computer-readable media of clauses 12-17, wherein the steps further comprise: determining a most common wall distance estimate in the plurality of candidate wall distance estimates and the candidate wall distance estimates received from the one or more other audio processing devices; and identifying the most common wall distance estimate as a ceiling distance estimate.

19. The one or more non-transitory computer-readable media of clauses 12-18, wherein the candidate wall distance estimates and confidence scores received from a second audio processing device of the one or more other audio processing devices are based on one or more other impulse responses determined by the second audio processing device.

20. In some embodiments, a system for estimating a room layout comprises: a plurality of audio processing devices in an acoustic environment, wherein a first audio processing device of the plurality of audio processing devices includes: one or more speakers; a microphone pair; one or more memories storing an audio processing application; and one or more processors coupled to the one or more memories that, when executing the audio processing application, perform the steps of: emitting a reference audio signal using the one or more speakers; receiving, by each microphone in the microphone pair, a response of the acoustic environment to the reference audio signal; determining an impulse response of the acoustic environment based on the reference audio signal and the received response of the acoustic environment; determining, based on the impulse response, a plurality of candidate wall distance estimates and a plurality of confidence scores, each confidence score of the plurality of confidence scores associated with a different candidate wall distance estimate of the plurality of candidate wall distance estimates; and determining based on the plurality of candidate wall distance estimates, the plurality of confidence scores, and candidate wall distance estimates and confidence scores received from one or more other audio processing devices, a set of wall distance estimates, each wall distance estimate in the set of wall distance estimates being associated with a different wall in a plurality of walls in the acoustic environment.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a “module,” a “system,” or a “computer.” In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:

emitting a reference audio signal using one or more speakers of an audio processing device located in an acoustic environment;

receiving, by each microphone in a microphone pair of the audio processing device, a response of the acoustic environment to the reference audio signal;

determining an impulse response of the acoustic environment based on the reference audio signal and one or more of the responses of the acoustic environment received by the microphone pair;

determining, based on the impulse response, a plurality of candidate wall distance estimates and a plurality of confidence scores, each confidence score of the plurality of confidence scores associated with a different candidate wall distance estimate of the plurality of candidate wall distance estimates;

receiving one or more other candidate wall distance estimates and one or more other confidence scores generated by one or more other audio processing devices; and determining, based on the plurality of candidate wall distance estimates, the plurality of confidence scores, and the one or more other candidate wall distance estimates and the one or more other confidence scores, a set of wall distance estimates, each wall distance estimate in the set of wall distance estimates being associated with a different wall in a plurality of walls in the acoustic environment.

2. The method of claim 1, wherein determining the set of wall distance estimates comprises clustering the plurality of candidate wall distance estimates associated with a first microphone in the microphone pair.

3. The method of claim 2, wherein clustering the plurality of candidate wall distance estimates associated with the first microphone comprises:

determining that a first candidate wall distance estimate of the plurality of candidate wall distance estimates associated with the first microphone is within a threshold distance from a second candidate wall distance estimate of the plurality of candidate wall distance estimates associated with the first microphone; and removing the first candidate wall distance estimate from the plurality of candidate wall distance estimates.

4. The method of claim 3, wherein removing the first candidate wall distance estimate from the plurality of candidate wall distance estimates comprises:

determining that a confidence score associated with the second candidate wall distance estimate is higher than a confidence score associated with the first candidate wall distance estimate; and determining, based on averaging the confidence score associated with the first candidate wall distance estimate and the confidence score associated with the second candidate wall distance estimate, a new confidence score associated with the second candidate wall distance estimate.

5. The method of claim 1, wherein determining the set of wall distance estimates comprises clustering the plurality of candidate walls distance estimates associated with different microphones in the microphone pair together.

6. The method of claim 5, wherein clustering the plurality of candidate wall distance estimates associated with the different microphones comprises:

determining that a first candidate wall distance estimate of the plurality of candidate wall distance estimates associated with a first microphone in the microphone pair is within a threshold distance from a second candidate wall distance estimate of the plurality of candidate wall distance estimates associated with a second microphone in the microphone pair; and determining the set of wall distance estimates includes at least one of the first candidate wall distance estimate of the plurality of candidate wall distance estimates associated with the first microphone or the second candidate wall distance estimate of the plurality of candidate wall distance estimates associated with the second microphone.

7. The method of claim 1, further comprising:

determining a most common wall distance estimate in the plurality of candidate wall distance estimates and the candidate wall distance estimates received from the one or more other audio processing devices; and identifying the most common wall distance estimate as a ceiling distance estimate.

8. The method of claim 1, wherein the reference audio signal comprises a sine sweep.

9. The method of claim 1, wherein the audio processing device and the other audio processing devices are located at a same height from a floor of the acoustic environment.

10. The method of claim 1, wherein the candidate wall distance estimates and confidence scores received from a second audio processing device of the one or more other audio processing devices are based on one or more other impulse responses determined by the second audio processing device.

11. The method of claim 1, further comprising:

determining, based on the set of wall distance estimates, an acoustic model of the acoustic environment;

processing one or more audio signals using the acoustic model; and emitting the one or more processed audio signals using the one or more speakers.

12. One or more non-transitory computer-readable media including instructions that, when executed by one or more processors, cause the one or more processors to perform the steps of:

emitting a reference audio signal using one or more speakers of an audio processing device located in an acoustic environment;

receiving, by each microphone in a microphone pair of the audio processing device, a response of the acoustic environment to the reference audio signal;

determining an impulse response of the acoustic environment based on the reference audio signal and one or more of the responses of the acoustic environment received by the microphone pair;

determining, based on the impulse response, a plurality of candidate wall distance estimates and a plurality of confidence scores, each confidence score of the plurality of confidence scores associated with a different candidate wall distance estimate of the plurality of candidate wall distance estimates;

receiving one or more other candidate wall distance estimates and one or more other confidence scores generated by one or more other audio processing devices; and determining, based on the plurality of candidate wall distance estimates, the plurality of confidence scores, and the one or more other candidate wall distance estimates and the one or more other confidence scores, a set of wall distance estimates, each wall distance estimate in the set of wall distance estimates being associated with a different wall in a plurality of walls in the acoustic environment.

13. The one or more non-transitory computer-readable media claim 12, wherein the step of determining the set of wall distance estimates comprises clustering the plurality of candidate wall distance estimates associated with a first microphone in the microphone pair.

14. The one or more non-transitory computer-readable media claim 13, wherein step of clustering the plurality of candidate wall distance estimates associated with the first microphone comprises:

determining that a first candidate wall distance estimate of the plurality of candidate wall distance estimates associated with the first microphone is within a threshold distance from a second candidate wall distance estimate of the plurality of candidate wall distance estimates associated with the first microphone; and removing the first candidate wall distance estimate from the plurality of candidate wall distance estimates.

15. The one or more non-transitory computer-readable media claim 14, wherein the step of removing the first candidate wall distance estimate from the plurality of candidate wall distance estimates comprises:

determining that a confidence score associated with the second candidate wall distance estimate is higher than a confidence score associated with the first candidate wall distance estimate; and determining, based on averaging the confidence score associated with the first candidate wall distance estimate and the confidence score associated with the second candidate wall distance estimate, a new confidence score associated with the second candidate wall distance estimate.

16. The one or more non-transitory computer-readable media claim 12, wherein the step of determining the set of wall distance estimates comprises clustering the plurality of candidate walls distance estimates associated with different microphones in the microphone pair together.

17. The one or more non-transitory computer-readable media claim 16, wherein the step of clustering the plurality of candidate wall distance estimates associated with the different microphones comprises:

determining that a first candidate wall distance estimate of the plurality of candidate wall distance estimates associated with a first microphone in the microphone pair is within a threshold distance from a second candidate wall distance estimate of the plurality of candidate wall distance estimates associated with a second microphone in the microphone pair; and determining the set of wall distance estimates includes at least one of the first candidate wall distance estimate of the plurality of candidate wall distance estimates associated with the first microphone or the second candidate wall distance estimate of the plurality of candidate wall distance estimates associated with the second microphone.

18. The one or more non-transitory computer-readable media claim 12, wherein the steps further comprise:

determining a most common wall distance estimate in the plurality of candidate wall distance estimates and the candidate wall distance estimates received from the one or more other audio processing devices; and identifying the most common wall distance estimate as a ceiling distance estimate.

19. The one or more non-transitory computer-readable media of claim 12, wherein the candidate wall distance estimates and confidence scores received from a second audio processing device of the one or more other audio processing devices are based on one or more other impulse responses determined by the second audio processing device.

20. A system for estimating a room layout comprising:

a plurality of audio processing devices in an acoustic environment, wherein a first audio processing device of the plurality of audio processing devices includes:

one or more speakers;

a microphone pair;

one or more memories storing an audio processing application; and one or more processors coupled to the one or more memories that, when executing the audio processing application, perform the steps of:

emitting a reference audio signal using the one or more speakers;

receiving, by each microphone in the microphone pair, a response of the acoustic environment to the reference audio signal;

determining an impulse response of the acoustic environment based on the reference audio signal and one or more of the responses of the acoustic environment received by the microphone pair;

determining, based on the impulse response, a plurality of candidate wall distance estimates and a plurality of confidence scores, each confidence score of the plurality of confidence scores associated with a different candidate wall distance estimate of the plurality of candidate wall distance estimates;

receiving one or more other candidate wall distance estimates and one or more other confidence scores generated by one or more other audio processing devices; and determining, based on the plurality of candidate wall distance estimates, the plurality of confidence scores, and the one or more other candidate wall distance estimates and the one or more other confidence scores, a set of wall distance estimates, each wall distance estimate in the set of wall distance estimates being associated with a different wall in a plurality of walls in the acoustic environment.

* * * * *